Jan. 6, 1931.  G. N. THOMAS  1,788,255
MINNOW BUCKET
Filed July 22, 1929
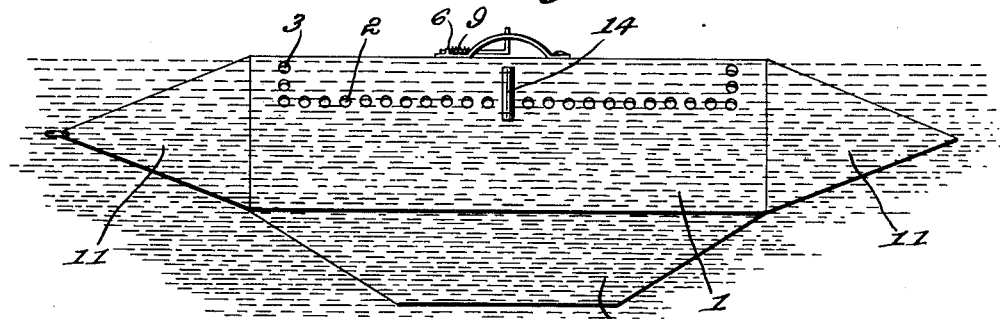
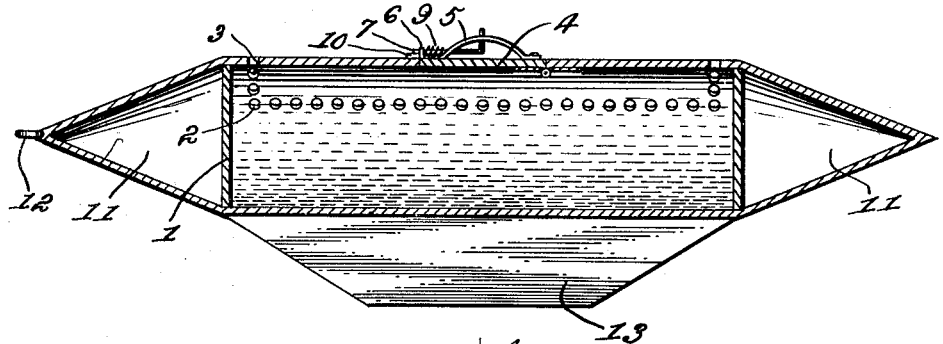
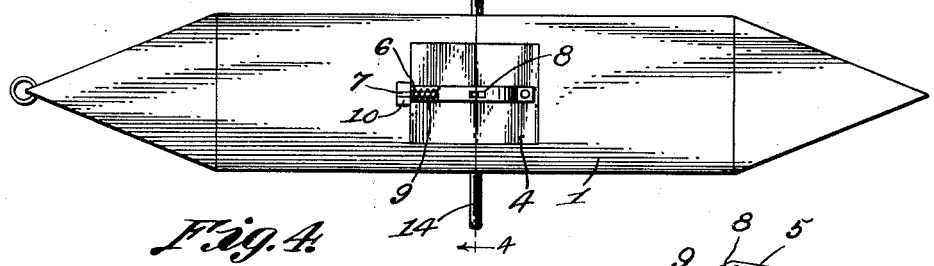
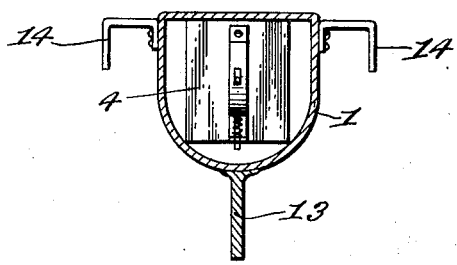
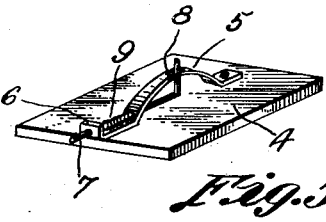
INVENTOR.
George N. Thomas,
BY
ATTORNEY.

Patented Jan. 6, 1931

1,788,255

UNITED STATES PATENT OFFICE

GEORGE N. THOMAS, OF MANKATO, MINNESOTA

MINNOW BUCKET

Application filed July 22, 1929. Serial No. 380,043.

The object of this, my present invention, is the provision of a floatable live bait box or receptacle of a construction whereby the same will be partly submerged in the water, so that a continuous flow of water will be let into the receptacle and thereby prolong the life of the bait indefinitely.

A further object is the provision of a live bait box that has its ends formed with conical air chambers, its bottom provided with a weighted keel, its sides, adjacent to its top provided with a series of longitudinally arranged spaced apertures and its sides, outward from the longitudinal apertures, being provided with other apertures, the said apertures providing both air and water inlets, the top of the box being provided with an inwardly opening door that has a novel catch for holding the same closed, the sides of the box being provided with hooks whereby the same may be suspended from either side of the fisherman's boat and one of the ends of the box being provided with an eye for a cable whose second end is attached to the boat of the fisherman.

To the attainment of the foregoing the invention consists in the improvement hereinafter described and definitely claimed.

In the drawings:

Figure 1 is a side elevation of my improvement.

Figure 2 is a substantially central longitudinal sectional view therethrough.

Figure 3 is a top plan view.

Figure 4 is a transverse sectional view on the line 4—4 of Figure 3 showing the door in open position.

Figure 5 is a perspective view of the door.

In carrying out my invention I make use of a substantially rectangular box-like member 1 which is preferably constructed of metal. The box affords a receptacle for the live bait. The box has its sides, adjacent to its top provided with longitudinally arranged apertures 2 and its said sides and if desired its top provided with a series of vertically arranged apertures 3 that extend upwardly from the longitudinal apertures 2. These apertures provide both air and water inlets for the box or receptacle.

The top of the box is provided with a substantially rectangular opening that is normally closed by a door 4 that is hinged so that the same will open into the box. The outer face of the door has fixed thereon the ends of an arched member 5 that provides the handle for the cover. One end of the handle member 5 is formed with an upstanding lug 6, and passing through this lug and through one side of the arched handle there is a spring influenced bolt 7. One end of this bolt is received through a slot 8 in the top of the handle 5. The spring 9, of course, influences the bolt to latching position, and the said bolt may be received in a keeper 10 or may rest upon the top of the box when the cover is in closed position.

Both ends of the box-like receptacle 1 are formed with or have soldered or otherwise secured thereto conical air chambers 11, and the pointed end of one of these chambers is provided with a hook 12 for the reception of a rope or cable whose second end is connected to the fisherman's boat. The box or receptacle 1 on its under face and at the center thereof is formed with a depending keel 13. The keel has its ends cut angularly, as disclosed by Figures 1 and 2 of the drawings. This keel is weighted and is preferably formed of lead or like metal.

Fixed on the sides of the box, at the center thereof, there are hook members 14, the same designed to be arranged over the gunwale of the fisherman's boat when the floating bait box is drawn along the side of the boat as when bait is to be removed therefrom.

My improvement permits of the continuous flow of fresh water into the receptacle 1 and protects the live bait from the rays of the sun as well as from rain. The construction is simple and the advantages thereof will, it is thought, be understood and appreciated by those skilled in the art without further detailed description.

Having described the invention, I claim:

1. A live bait receptacle comprising a box-like member having conical air chambers on the ends thereof, a central depending weighted keel, said box having its sides, adjacent its top provided with a longitudinal series of apertures and a vertical series of apertures directed upwardly from the longitudinal series of apertures, the top of the box having an opening therethrough, an inwardly opening hinged cover for closing the opening, an arched handle for the cover, a spring influenced bolt guided by and movable through one end of the handle and a keeper on the box for the bolt.

2. A live bait receptacle comprising a box-like member having conical air chambers on the ends thereof, a central depending weighted keel, said box having the sides, adjacent its top, provided with a longitudinal series of apertures and a vertical series of apertures directed upwardly from the longitudinal series of apertures, the top of the box having an opening therethrough, an inwardly opening hinged cover for closing the opening, an arched slotted handle having outwardly extending straight bottom portions which are secured to the cover and one of said bottom portions having an upstanding lug, a spring influenced bolt slidable through one end of the handle and through the lug, said bolt having an angled end received through the slot of the handle for limiting the movement of the bolt in two directions and a keeper on the box for the bolt.

In testimony whereof I affix my signature.

GEORGE N. THOMAS.